Oct. 16, 1928.
S. R. W. M. BAGER
1,687,658
STEERING MECHANISM
Filed May 2, 1923
3 Sheets-Sheet 1
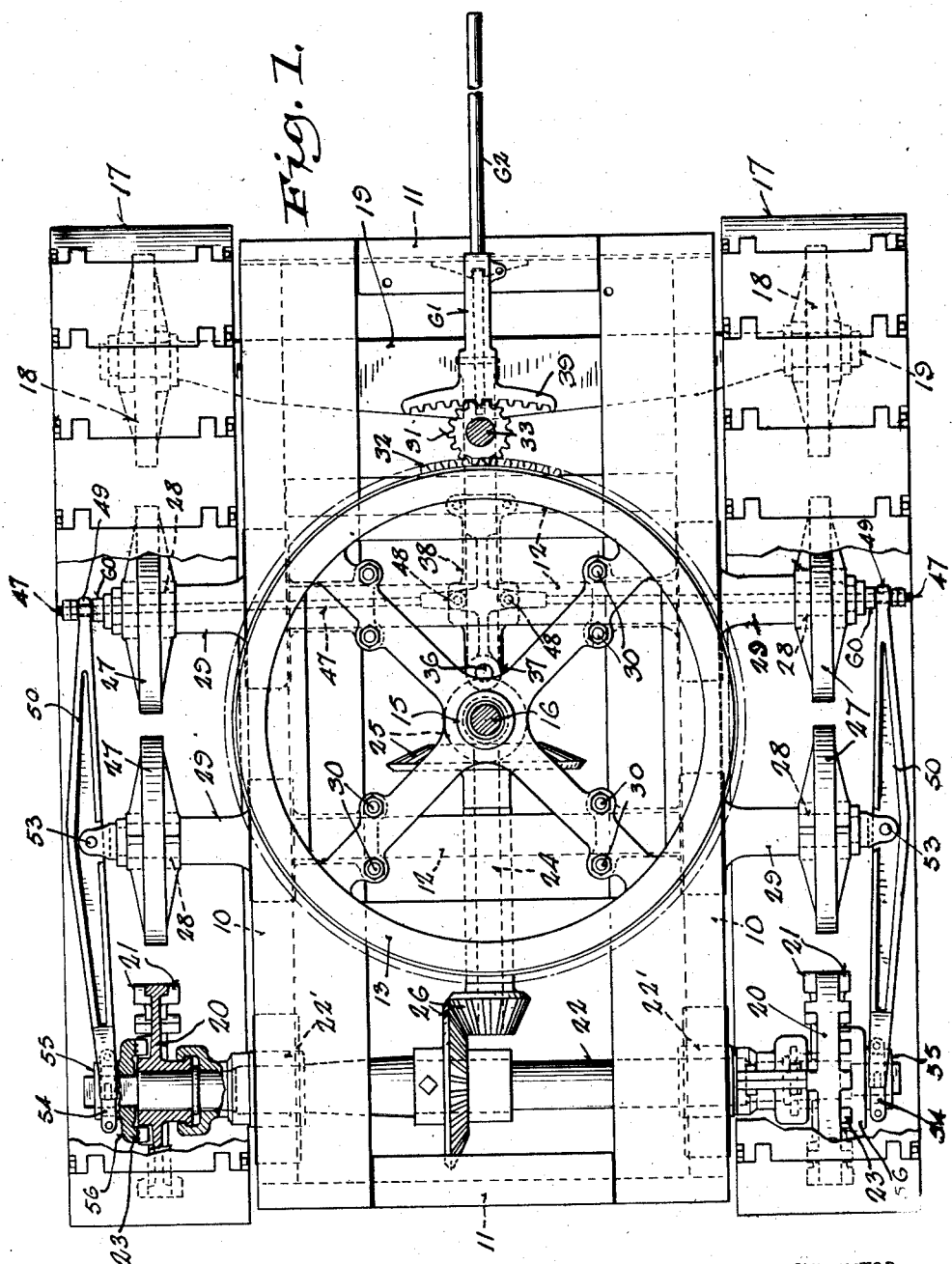
INVENTOR.
SVANTE R.W.M. BAGER
BY
Ralph W. Brown
ATTORNEY.

Oct. 16, 1928.  
S. R. W. M. BAGER  
1,687,653  
STEERING MECHANISM  
Filed May 2, 1923   3 Sheets-Sheet 2
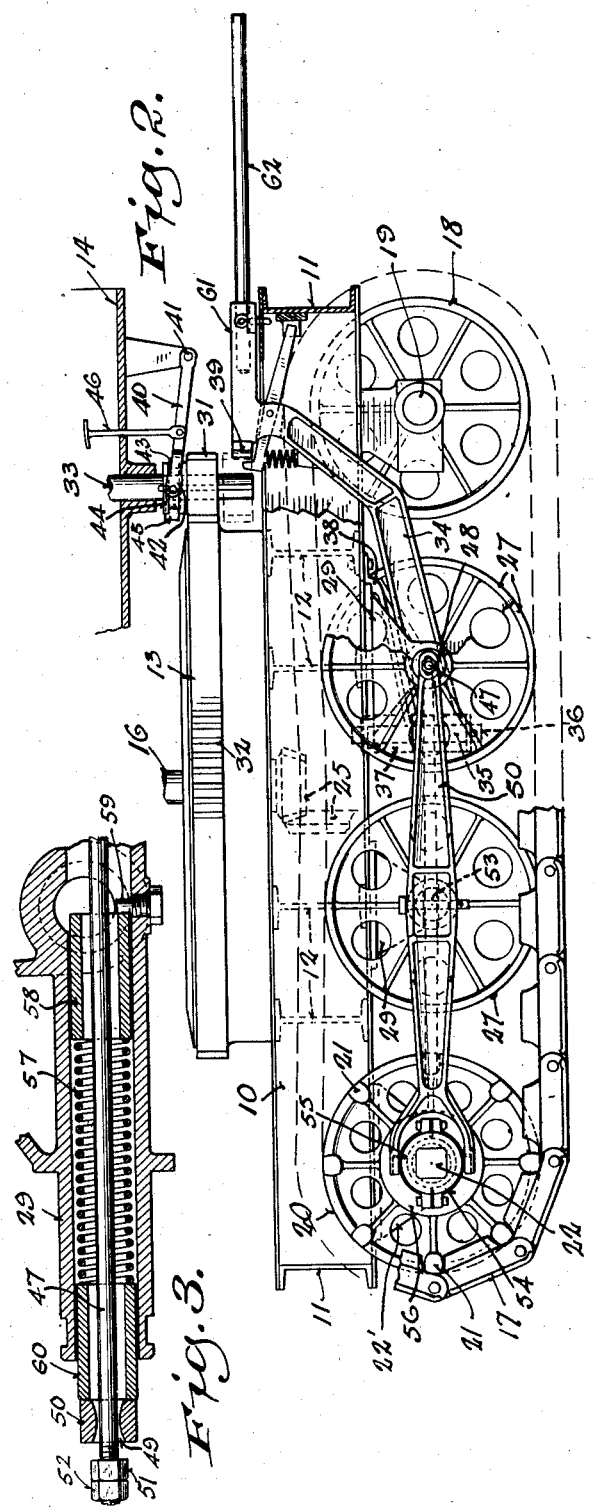
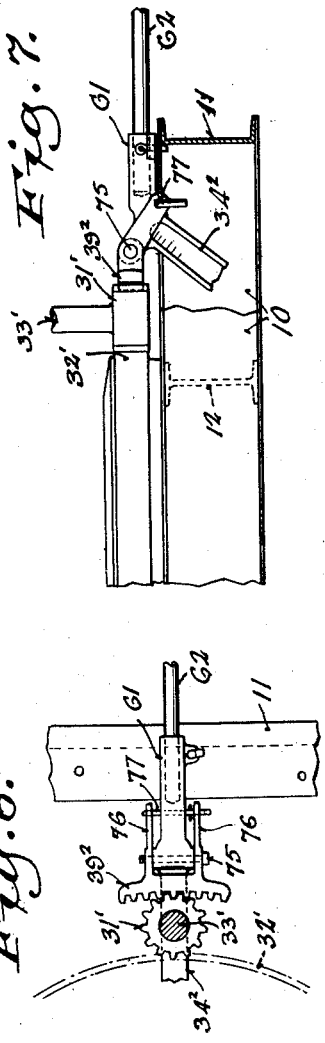
INVENTOR.  
SVANTE R. W. M. BAGER  
BY  
ATTORNEY.

Oct. 16, 1928.
S. R. W. M. BAGER
1,687,653
STEERING MECHANISM
Filed May 2, 1923   3 Sheets-Sheet 3
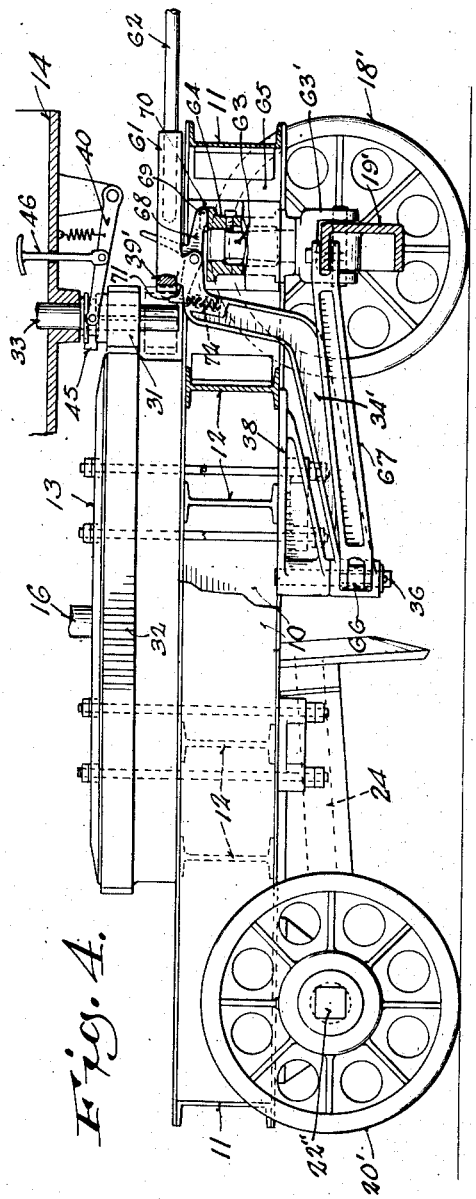
INVENTOR.
SVANTE R.W.M. BAGER
BY
Ralph W. Brown
ATTORNEY.

Patented Oct. 16, 1928.

1,687,653

UNITED STATES PATENT OFFICE.

SVANTE R. W. M. BAGER, OF SOUTH MILWAUKEE, WISCONSIN, ASSIGNOR TO BUCYRUS-ERIE COMPANY, OF SOUTH MILWAUKEE, WISCONSIN, A CORPORATION OF DELAWARE.

STEERING MECHANISM.

Application filed May 2, 1923. Serial No. 636,137.

This invention relates to steering mechanism for power excavators, cranes and the like, in which the upper or head frame, carrying the operating parts, is revoluble with respect to the base or truck frame.

In machines of this character, direct connections have heretofore been employed between the head frame and steering axle, in the case of wheel traction, or between the head frame and appropriate clutches on the driving shaft, in the case of creeping traction, so that steering movements are dependent upon and responsive to actual rotation of the head frame.

The general aim of the present invention is the provision of steering mechanism which is not dependent for its operation upon actual rotation of the head frame but in which steering is effected by the application of power derived from the mechanism ordinarily employed for rotating the frame.

A more specific object is the provision of steering mechanism which may be made to respond to rotation of the swing pinion ordinarily employed as part of the head frame rotating mechanism.

Another object is the provision of a novel steering mechanism for creeping traction mechanisms, permitting assembly of the operating parts in readily accessible positions outside of the traction elements.

Other objects and advantages will appear from the following description of several illustrative embodiments of the invention.

In the drawings:

Figure 1 is a plan view of the truck frame of a power excavator equipped with a steering mechanism constructed in accordance with the present invention.

Figure 2 is a view in side elevation, partly in section, of the machine shown in Figure 1.

Figure 3 is a vertical sectional view of a portion of one of the bearing roller supports.

Figure 4 is a side elevation, partly in section, illustrating a wheeled truck frame equipped with a steering mechanism embodying features of the present invention.

Figure 5 is a plan view of the steering mechanism shown in Figure 4.

Figures 6 and 7 are fragmentary views in plan and elevation, respectively, illustrating a slightly different form of steering mechanism applied to the truck frame of a creeping traction machine.

Figure 8 is a fragmentary view similar to Figure 7 showing a similar steering mechanism applied to a wheeled truck frame.

A steering mechanism constructed in accordance with the present invention will first be described as embodied in a power excavator of the creeping traction type. The base or truck frame of a machine of that type is illustrated in Figures 1 and 2. This frame is of substantially the same construction as that fully described in U. S. Patent No. 1,574,041 of S. R. W. M. Bager and Werner Lehman. It comprises a pair of longitudinal side sills 10 rigidly connected with a pair of end bars 11 and a series of transverse intermediate bars 12. The intermediate bars 12 and longitudinal sills 10 constitute a support for a rigid casting 13 in the form of a combined rack and track member for rotatably supporting the head frame 14. The casting 13 is provided with a central hub 15 through which the usual vertical propulsion shaft 16 extends and about the axis of which the head frame is permitted to revolve.

The truck frame is supported upon two sets of rollers respectively disposed beyond the sides of the frame, each set being disposed to travel upon an endless tread belt 17 trained thereabout. The front rollers 18 are journaled upon the ends of an axle 19 adjustably fixed to and beneath the longitudinal sills 10. The rear rollers 20 are provided with belt engaging lugs 21 and are driven from the rear axle shaft 22, on which they are mounted, through clutches 23 to be hereinafter described. The shaft 22 is journaled in bearings 22' secured to and beneath the sills 10 and is driven from the vertical propulsion shaft 16 through the usual intermediate shaft 24 and bevel gear sets 25 and 26. Each of the intermediate rollers 27 is journaled upon the end of a separate stub shaft 28 constituting part of a bracket arm 29 secured intermediate its ends to and beneath a longitudinal sill 10 and fixed at its inner end beneath a transverse bar 12 to tie-bolts 30 extending downwardly from the casting 13 and embracing the bar 12. The forward pair of bracket arms 29 are preferably hollow for a purpose which will hereinafter appear.

The head frame 14 is rotated about the axis of the shaft 16 by means of a pinion 31 which normally meshes with a fixed rack 32 extending about the periphery of the casting 13. Pinion 31 is carried by and driven from a vertical shaft 33 journaled in the head frame and actuated by the usual mechanism (not shown) carried by the frame. In this instance, the pinion 31 is splined to the shaft 33, so as to permit lowering of the pinion out of mesh with the fixed rack 32. It will be noted that the plane of the rack 32 is sufficiently elevated above the truck frame to provide the necessary clearance between the extended lower end of the pinion shaft 33 and truck frame, as the head frame revolves.

The steering mechanism shown comprises a lever 34 mounted at one end 35 upon a vertical pivot pin 36 so as to swing in a horizontal plane about an axis adjacent the pivotal axis of the head frame. Pin 36 is removably fixed in a boss 37 formed on the rear end of a bracket plate 38, secured to and beneath the forward pair of intermediate transverse bars 12. The lever 34 extends forwardly and upwardly above the truck frame to a point in advance of the casting 13 and at its upper end is provided with a segmental rack 39 below the plane of the fixed rack 32 so as to mesh with the swing pinion 31 when lowered out of mesh with the fixed rack.

It will thus be noted that when the pinion 31 is in its normal upper position in mesh with the rack 32, rotation thereof will cause rotation of the head frame 14 in the usual manner. When shifted downwardly along the shaft 33 out of mesh with rack 32 and into mesh with segmental rack 39 rotation of this pinion will cause the lever 34 to swing laterally in one direction or the other from its normal neutral position along the central longitudinal axis of the truck frame.

The position of elevation of the pinion 31 may be determined by any appropriate means under control of the operator. In the machine shown, this means comprises a lever 40 hinged at one end upon a horizontal pivot 41 carried by the head frame and provided with a bifurcated portion 42 having the usual pins in rotative engagement with an annular groove 43 formed in a collar 44 fixed to the pinion. This lever 40 also preferably carries a finger 45 engageable between the teeth of the rack 32 when the pinion is lowered, so as to lock the head frame against rotation when the pinion is disengaged from the rack 32. A link 46 connected with the lever 40 and extending upwardly through the floor of the head frame into convenient reach of the operator may be employed for adjusting the lever 40.

A pair of pull rods 47, each extending through one of the hollow bracket arms 29, are connected at their inner ends 48 to the opposite sides of the lever 34. Each rod 47 extends loosely through an eye 49 in the forward end of a lever 50 and at its free end is provided with a nut 51 and locknut 52 adapted to bear against this end of lever 50 when the rod is drawn inwardly by lever 34. Each of the levers 50 is mounted intermediate its ends upon a vertical pivot 53 carried by the outer end of one of the rearward pair of stub shafts 28. The rear end of each lever 50 is pivotally connected with a collar 54 rotatably fixed upon a sleeve 55 forming a part of a clutch element 56, splined upon one end of the rear axle shaft 22. Each clutch element 56 is yieldably retained in interlocking engagement with corresponding clutch teeth formed on the face of the adjacent rear roller 20, so that both rear rollers are normally locked to the rear axle shaft 22 so as to rotate therewith. In this instance, this normal closed condition of the clutches is effected by the provision of coiled compression springs 57 each disposed within one of the forward bracket arms 29. As shown in Figure 3, each spring 57 bears at one end against a sleeve 58 retained in fixed position within the arm 29 by a stud 59, and at the other end bears outwardly against a movable sleeve 60 which in turn bears against the forward end of the lever 50 so as to yieldably maintain the lever in clutch engaging position.

During normal operation of the machine as an excavator or crane, the pinion 31 is normally in the upper position in mesh with the fixed rack 32 in which position swinging of the upper frame may be effected in the usual manner by rotation of the pinion. In order to utilize the swing mechanism for steering purposes, the head frame is first swung into such position that the pinion 31 is above the center of the segmental rack 39 and the pinion 31 then lowered out of mesh with the fixed rack 32 into mesh with the segmental rack. This is accomplished by depressing the link 46 and thereby forcing the lever 40 downwardly to the dotted line position indicated in Figure 2 in which poistion the tooth 45 on the lever 40 engages between the teeth of the fixed rack 32 to lock the head frame against rotation.

As above pointed out, the two clutches cooperating with the rear rollers 20 are normally in closed condition so that these rollers normally rotate in unison with the rear axle shaft 22, and this shaft being driven from the vertical propulsion shaft 16 causes a straight line travel of the machine. A turning movement of the machine is effected by rotation of the pinion 31 in mesh with the segmental rack 39. For instance, rotation of pinion 31 in a clockwise direction (Fig. 1) causes the segmental rack 39 and lever 34 to swing in a like direction. When this occurs, the pull rod 47 on the left side of the machine is drawn inwardly, the nut 51 thereon pressing the forward end of the lever 50 inwardly against the pressure of spring 57 and causing the rear end of this lever to swing outwardly so as to withdraw the clutch element 56 out of engagement with the clutch teeth on the corresponding roller 20. In this condition of the parts, this roller is released from driving engagement with the shaft and a driving force is applied to the roller 20 on the right side of the machine only. This obviously results in a turning movement of the machine toward the left. A turning movement in the other direction is similarly effected by a rotation of the pinion 31 in the opposite direction.

In the machine shown, provision is also made for steering by hand. For this purpose, the upper end of lever 34 carries a forwardly projecting hollow boss 61 adapted to removably but snugly receive the end of a bar 62. This bar may be used as a handle to swing lever 34 in either direction from its neutral position to thus selectively release the clutch substantially in the manner above described.

Figures 4 and 5 illustrate a similar type of steering mechanism applied to a power excavator mounted on wheels. The truck frame of this machine is constructed in substantially the same manner as that hereinabove described. In this instance, however, the front wheels 18' are journaled upon the ends of an axle 19' rockably mounted between the bifurcations 63' of a vertical king pin 63. The pin 63 is journaled in a rigid mounting 64 extending transversely between and rigidly secured at its opposite ends to a pair of plates 65. Plates 65 are secured at their opposite ends to and between the forward transverse bar 11 and the adjacent intermediate transverse bar 12. The rear driving wheels 20' are keyed to the opposite ends of the rear axle shaft 22'' journaled beneath the longitudinal sills 10 of the truck frame and driven from the vertical propulsion shaft 16 through the intermediate shaft 24 and appropriate gearing.

The swing pinion 31 is splined upon and driven by the shaft 33 so as to be vertically shiftable from in mesh with the fixed rack 32 into mesh with a segmental rack 39' carried by the lever 34'. The position of elevation of this pinion is manually controlled in the manner hereinabove pointed out by the link 46 and lever 40, lever 40 having the finger 45 engageable between the teeth of the fixed rack 32 when in lower position to lock the head frame 14 against rotation.

The steering lever 34' is mounted at its rear end to swing about a vertical pivot pin 36 mounted in a fixed bracket plate 38 in the manner above described. In this instance, however, a laterally extending crank arm 66 is rigidly secured to the pivoted end of the lever 34' to swing therewith. This crank arm is operatively connected to the front axle 19' through a heavy link 67. The arrangement is such that when the lever 34' is swung in either direction from a neutral intermediate position, the front axle 19' is swung about the axis of the king pin 63 for steering purposes.

Manual steering may thus be effected by the use of a bar 62 insertable in the hollow boss 61 carried by the lever 34'. For power steering, however, the pinion 31 is lowered into mesh with the segmental rack 39' so that the lever 34', and consequently the front axle may be swung in response to rotation of this pinion.

Provision is preferably made for automatically locking the front axle against horizontal swinging during normal operation of the machine. For this purpose, trip dog 68 is provided pivoted intermediate its ends upon the upper forward end of lever 34'. One end 68 of this dog is provided with a tooth 69 engageable in appropriate grooves 70 found in the top face of the mounting 64 so as to releasably lock the lever 34' against swinging. The other end 71 of dog 68 is fashioned to project into the path of vertical movement of the pinion 31. A spring 72 yieldably maintains the dog 68 in locking engagement when the pinion 31 is in upper position in mesh with the rack 32. The pinion 31, however, in its downward movement into mesh with the segmental rack 39' depresses the end 71 of the dog and rocks the dog into released position.

In some machines, particularly those of the smaller type in which it is desirable to avoid the increased height of the casting 13 necessitated by the elevation of the rack 32, the steering mechanism may be so designed as to avoid the necessity of withdrawing the swing pinion 31 out of mesh with the rack 32. A steering mechanism involving these features for use in machines of the creeping traction type is shown in Figures 6 and 7, while in Figure 8 a steering mechanism for use in a wheeled machine is shown.

In Figures 6 and 7, the steering lever 34², similar to that hereinabove described, carries at its upper end a segmental rack 39² mounted to swing about a horizontal pivot pin 75. The swing pinion 31' is, in this instance, fixed to its driving shaft 33' and is always in mesh with the fixed rack 32'. By swinging the segmental rack about its pivot 75 it may be thrown into or out of mesh with the pinion. The position of the segmental rack is controlled by a pair of tail pieces 76 formed as an integral part thereof and fashioned to receive a locking pin 77. When in the position shown in full lines in Figure 7, the pin 77 engages beneath the boss 61 of the lever 34² and retains the segment 39² in mesh with the pinion. After releasing the pin 77, however, the segment may be rocked into the dotted position shown, out of mesh with the pinion, and retained in such position by reinsertion of the pin in the tail pieces above the boss 61.

When in pinion engaging position, the segmental rack 39², and consequently the lever 34², swing in response to rotation of the pinion to effect a selective release of the clutches substantially as hereinabove described. The slight rotation of the head frame resulting from the travel of the pinion 31' about the rack 32', due to the fact that it is retained in mesh therewith, is not sufficient to materially interfere with the steering operations or travel of the machine.

The mechanism shown in Figure 8 is similar to that just described, except that the segmental rack 39³ is mounted on the lever 34³ so as to swing upwardly rather than downwardly from in mesh with the swing pinion 31'. In this case, the lever 34³ is operatively connected with the front steering axle of the machine so that swinging of the lever 34³ in response to rotation of the pinion causes a corresponding swinging of the front axle.

Specific claims to the selective feature of Figure 2 are included in my copending application, Serial No. 128,984, filed August 13, 1926.

Various changes may be made in any of the several embodiments of the invention hereinabove described, without departing from or sacrificing any of the advantages of the invention as defined in the appended claims.

I claim:

1. In a machine of the character described the combination of a base frame, a creeping traction mechanism at each side of said frame, a head frame rotatable on said base frame, a drive shaft operated from said head frame, a clutch between each traction mechanism and said shaft, said clutches being disposed at the outer sides of said traction mechanisms, and a line of control for said clutches extending from the head frame to a point in the base frame intermediate the two creeping traction mechanisms, thence branching and extending through axle members of the creeping traction mechanism to said clutches, for controlling said clutches to steer the machine.

2. In a creeping traction unit, the combination of a creeping traction belt, a driving wheel for said belt, a plurality of load-sustaining wheels running on said belt, shafts (one of them being hollow) for journally mounting said load-sustaining wheels, a lever pivoted on one of these shafts and actuated by means within the hollow shaft, a drive shaft, and a clutch between said drive-shaft and said driving wheel, actuated by said lever.

3. In a creeping traction unit, the combination of a creeping traction belt, a driving wheel for said belt, a plurality of load-sustaining wheels running on said belt, shafts (one of them being hollow) for journally mounting said load-sustaining wheels, a lever pivoted on the outer end of one of these shafts and actuated by means within the hollow shaft, a drive-shaft, and a clutch between said drive-shaft and said driving wheel at the outer side of said unit, said clutch being actuated by said lever.

4. In a machine of the character described the combination of a base frame, a creeping traction mechanism at each side of said frame, a head frame rotatable on said base frame, a drive shaft operated from said head frame, a clutch between each traction mechanism and said shaft, said clutches being disposed at the outer sides of said traction mechanisms, and means operated from said head frame between said traction mechanisms for controlling said clutches to steer the machine, said means passing through axle members of said traction mechanism.

5. In a machine of the character described, the combination of: a base frame, a head frame, supported thereby and rotatable with respect thereto; traction means supporting the base frame; mechanism to swing the head frame relative to the base frame, consisting in a circular rack carried by the base frame, and a rotatable pinion carried by the head frame and engaging the rack; a rack, carried by the base frame, and rockable into and out of mesh with said pinion; and means operated by said rack for steering the machine.

6. In a machine of the character described, the combination of: a base frame, a head frame, supported thereby and rotatable with respect thereto; traction means supporting the base frame; steering mechanism for said traction means; mechanism to swing the head frame relative to the base frame, consisting in a circular rack carried by the base frame, and a rotatable pinion carried by the head frame and engaging the rack; and means whereby the rotation of the pinion, while the pinion still maintains its engagement with the rack, can at will be used to actuate said steering mechanism by a series of mechanical operations constituting a chain of causation which does not include the rotation of the head frame, 7. In a machine of the character described, the combination of: a base frame, a head frame, supported thereby and rotatable with respect thereto; traction means supporting the base frame; steering mechanism for said traction means; mechanism to swing the head frame relative to the base frame; and means whereby the action of said swing mechanism, while still remaining in operative engagement, can at will be used to actuate said steering mechanism, otherwise than through the rotation of the head frame.

8. In a machine of the character described, the combination of: a base frame; a head frame supported thereby and rotatable with respect thereto; traction means supporting the base frame; means to swing the head frame relative to the base frame, said means consisting of a circular rack carried by the base frame and of a rotatable pinion depending from the head frame and directly engageable with the rack; and steering mechanism having a member, located on the base frame, and directly and releasably engageable with said depending pinion, for rendering the steering mechanism responsive to the rotation of the pinion.

9. In a machine having a base frame, a head frame rotatably supported thereby, and power actuated steering means; a steering mechanism therefor, comprising: a steering lever carried by said base frame; a rack associated with said lever; a driving pinion carried by said head frame; means for effecting a relative shifting between said rack and pinion into and out of intermeshing engagement; and manually operated means for swinging said lever, otherwise than through said pinion.

10. In a machine of the character described, the combination of: a base frame; a head frame supported thereby and rotatable with respect thereto; traction means supporting the base frame; steering mechanism; means for actuating said steering mechanism; a pinion, depending from the head frame and directly engaging a rack carried by the base frame, whereby to rotate the head frame; and means whereby the rotation of the pinion can at will be used to operate the means for actuating said steering mechanism, otherwise than through the rotation of the head frame, and otherwise than by means passing through the axis of rotation of the head frame.

11. In a machine of the character described, the combination of: a base frame; a head frame supported thereby and rotatable with respect thereto; traction means supporting the base frame; means to swing the head frame relative to the base frame, said means consisting of a circular rack carried by the base frame and of a rotatable pinion depending from the head frame and engageable with the rack; and steering mechanism comprising: a steering lever carried by said base frame; a concave rack associated with said lever; and means for effecting a relative shifting between said concave rack and said pinion into and out of intermeshing engagement.

12. In a machine having a base frame, a head frame rotatably supported thereby, and power actuated steering means; a steering mechanism therefor, comprising: a steering lever carried by said base frame; a concave rack associated with said lever; a driving pinion carried by said head frame; and means for effecting a relative shifting between said rack and pinion into and out of intermeshing engagement.

13. In a machine of the character described, the combination of: a base frame; a head frame supported thereby and rotatable with respect thereto; traction means supporting the base frame; steering mechanism on the base frame associated with the traction means; a pinion, depending from the head frame, whereby to rotate the head frame with respect to the base frame; a rack on the base frame, so contrived and adapted as to be movable at will with respect to the base frame by the rotation of the pinion; and means operatively connecting this rack to the steering mechanism, so as to render the steering mechanism responsive to the movement of the rack, and thus to the rotation of the pinion.

In witness whereof, I hereunto subscribe my name.

SVANTE R. W. M. BAGER.